United States Patent Office 3,560,429
Patented Feb. 2, 1971

3,560,429
FERROCENE-XYLYLENE COPOLYMERS
AND PROCESS
Norman Bilow, Los Angeles, Calif., and Harold Rosenberg, Dayton, Ohio, assignors to the United States of America as represented by the Secretary of the Navy
No Drawing. Filed Mar. 6, 1969, Ser. No. 805,007
Int. Cl. C08f 45/04, 45/30
U.S. Cl. 260—33.8
12 Claims

ABSTRACT OF THE DISCLOSURE

Thermosetting ferrocene-xylylene glycol copolymers and polyferrocenylene-xylylene glycol copolymers are prepared by reacting ferrocenyl compounds with xylylene glycol in the presence of a suitable catalyst. These copolymers can be molded and cured to structures of extremely high molecular weight by treatment with heat and pressure. The property of being thermosetting makes the copolymers of this invention useful in the fabrication of composite plastic structures.

BACKGROUND OF THE INVENTION (1) Field of the invention

The present invention is concerned with ferrocene-xylylene glycol copolymers and polyferrocenylene-xylylene glycol copolymers which are thermosetting and curable to high molecular weights.

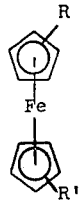

(2) Description of the prior art

Thermoplastic, low molecular weight ferrocene polymers and infusible, intractable ferrocene polymers are known in the art. Furthermore, the ferrocenyl moiety has been recognized, since its discovery in 1951, for its unusual resistance to high temperatures and its high stability under various forms of radiation. However, since the prior art polymers have been thermoplastic or intractable, rather than thermosetting, it has been impossible to take full advantage of the aforementioned properties of ferrocene polymers in the field of reinforced composite structures.

SUMMARY OF THE INVENTION

This invention solves a problem previously existing in the art by making available thermosetting copolymers containing the ferrocene moiety. The said copolymers are prepared by reacting ferrocene or low molecular weight ferrocenylenes with xylylene glycol at reflux temperatures in the presence of a solvent or at melt temperatures in the absence of a solvent. Suitable catalysts for the reaction are strong acids, such as p-toluenesulfonic acid, benezenesulfonic acid, phosphoric acid, and Lewis acids, such as boron trifluoride etherate, boron trifluoride, aluminum trichloride and zinc chloride.

DESCRIPTION OF THE PREFERRED EMBODIMENTS

In practicing the teachings of the present invention, low molecular weight copolymers can be prepared which are soluble in lacquer or varnish type solvents. These copolymers are thermosetting and consequently heat curable to high molecular weight resins. This property allows these copolymers to be used in fabricating composite structures.

Starting materials suitable for the practice of the first embodiment of this invention are of the types:

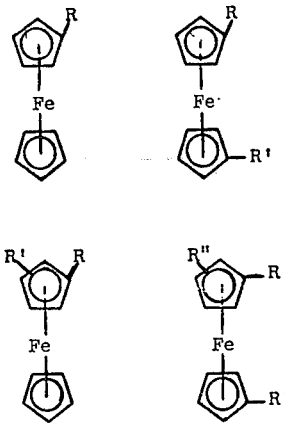

and wherein R, R' and R" may be H, $CH_3$, $C_2H_5$, $C_3H_7$, $C_4H_9$, $C_6H_5$, SH, Cl, Br, I and various other alkyl, aryl, alkaryl, or aralkyl groups. These ferrocene compounds are reacted with xylylene glycol to obtain the thermosetting copolymers of the invention.

The low molecular weight copolymers may be prepared according to the following general reaction:

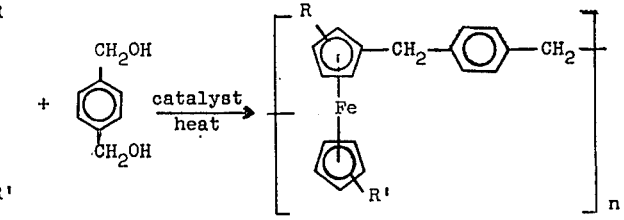

wherein R and R' are selected from the group of H, $CH_3$, $C_2H_5$, $C_3H_7$, $C_4H_9$, $C_6H_5$, SH, Cl, Br, I and various other alkyl, aryl, alkaryl and aralkyl groups. The letter $n$ represents an integer which is inclusive of the integers 2 through 10. Catalysts may be selected from the group including boron trifluoride, p-toluenesulfonic acid, benzenesulfonic acid and phosphoric acid. In the above equation, the word "heat" means heating to reflux temperature for a period of several hours if a solvent is used or heating to a temperature high enough to melt the reactants if a solvent is not used. The copolymers prepared by this process are soluble in certain lacquer or varnish type solvents and cure to high molecular weights when subjected to pressure and further heat.

Examples of varnish or lacquer type solvents which have proven useful are methylene chloride, chloroform, trichloroethylene, carbon tetrachloride and tetrachloroethane. A varnish can be prepared by dissolving one of the low molecular weight copolymers in one of the above solvents. The lacquer can then be applied to a reinforcing material such as glass fabric, carbon cloth, asbestos, quartz, or any other suitable reinforcing agent or it can be blended with a suitable filler, such as clay, silica, titania and powdered thermoset phenolic resin. When the resultant coated structure is then subjected to more heat and pressure is applied, the copolymers cure to hard resins with extremely good heat resistance properties. On the other hand, the dry powdered copolymers or filled resinous compositions can be placed in a mold and a heat-and-pressure cure effected without first dissolving them in a solvent. Temperatures ranging from about 200° C. to about 400° C. and pressures ranging from about 200 p.s.i. to about 4000 p.s.i. are suitable for preparing the laminated articles.

Example I

A mixture of p-xylene glycol (13.8 g., 0.1 mole), p-toluenesulfonic acid monohydrate (3.8 g., 0.02 mole), ferrocene (18.6 grams, 0.1 mole) and chloroform (150 ml.) was heated at reflux temperature using a water trap to remove water produced by the reaction. After 18 hours the mixture was concentrated to dryness. The dried reaction product whose structure is represented by

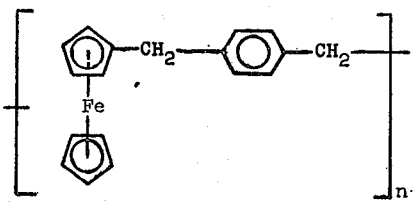

wherein $n$ is an integer of from 2 to 10, weighed 29 grams and melted between 100° C. and 150° C. The reaction product cured to a hard, heat-resistant resin suitable for use in the manufacture of reinforced composite articles when heated to a temperature of 180° C.

Example II

When 13.8 grams of p-xylylene glycol and 18.6 grams of ferrocene were heated in tetrachloroethane (150 ml.) at the boiling point and no catalyst was used, the reaction mixture produced a curable but badly degraded, tarry product.

Example III

A mixture of 13.8 grams (0.1 mole) of xylylene glycol, 18.6 grams (0.1 mole) of ferrocene and 1.0 gram of phosphoric acid was melted at 140 to 150° C. for six hours. The reaction product was a copolymer of the same general structure as that given in Example I. This copolymer was then cooled and pulverized. It melted at 55 to 85° C. and cured at about 250° C.

Example IV

A mixture of 13.8 grams (0.1 mole) of p-xylylene glycol, 18.6 grams (0.1 mole) of ferrocene and 1.9 grams (0.01 mole) of p-toluenesulfonic acid monohydrate were melted at 70 to 85° C. After six and one-half hours the viscous copolymer was cooled and powdered. It melted at 40 to 90° C. and cured at 175° C.

Example V

A mixture of 13.8 grams (0.1 mole) of p-xylylene glycol and 1.9 grams (0.01 mole) of p-toluenesulfonic acid monohydrate were heated in chloroform with stirring for 20 hours while removing water in an azeotropic trap. During this time, 1.3 ml. of water were produced. After this initial reaction, 18.6 grams (0.1 mole) of ferrocene was added and heating of the reaction was continued, at reflux temperature, for 23 hours. During this period, additional water (0.3 ml.) was collected. The chloroform solvent was then removed by vacuum evaporation and the dried copolymer collected. The yield of copolymer (32 grams) was 94% of theoretical. It melted at 70 to 100° C. and cured at 170° C.

Example VI

A copolymer of ferrocene and p-xylylene glycol was prepared by refluxing for 1 hour a solution containing ferrocene (10.0 grams) and p-xylylene glycol-p-toluenesulfonic acid telomer (equivalent to 11.1 grams of p-xylylene glycol) in chloroform. The total weight of the solution was 156 grams. The p-xylylene glycol-p-toluenesulfonic acid telomer was prepared by reflxing for 18 hours p-xylylene glycol (30 grams) and p-toluenesulfonic acid monohydrate (10.4 grams) in 250 ml. of chloroform while removing the water formed (ca. 4 ml.) with a water trap.

The polymer lacquer was useful as obtained for impregnating reinforcement materials or powdered mineral fillers. Impregnated fabrics made therefrom were cut to shape, then stacked and molded at about 200±50° C. and 200–4000 p.s.i. Dried resin-mineral filler blends were also molded under similar conditions.

In a second embodiment of this invention, prior art low molecular weight polyferrocenylenes may be made into curable, thermosetting resins by the following general reaction:

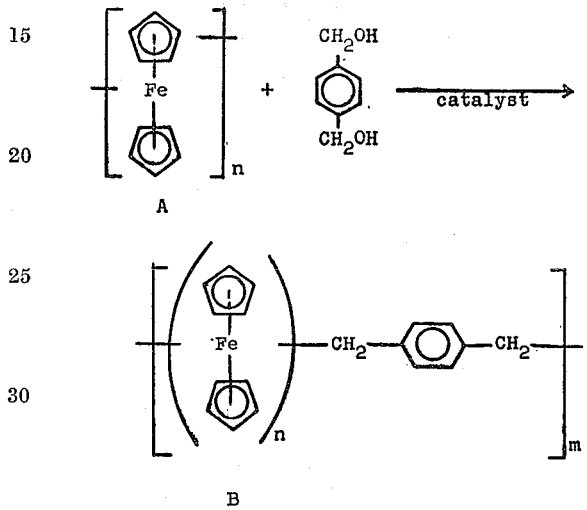

wherein $n$ is an integer of from about 2 to about 10 and $m$ is an integer of from about 2 to about 20 when representing the structures of partially cured, still soluble copolymers. With reference to the structures of completely cured, insoluble copolymers, $m$ is indeterminate. However, the completely cured resins are estimated to have molecular weights of several hundred thousand.

Lacquers suitable for the preparation of laminated articles may be prepared according to the following examples.

Example VII

Polyferrocenylene (20 grams, 0.036 mole) with a molecular weight of 560 (determined by vapor phase osmometry), p-xylylene glycol (7.0 grams, 0.051 mole), p-toluenesulfonic acid monohydrate (1.0 gram, 0.0059 mole), chloroform (100 ml.) and chlorobenzene (100 ml.) were heated at reflux for 24 hours. Approximately 1 ml. of water was isolated from the reaction mixture by azeotropic distillation. The reaction produced an impregnation lacquer which was free of insoluble material and suitable for the preparation of laminates. The solvent can also be removed, without setting, to yield molding resin materials.

Example VIII

A telomer of p-xylylene glycol-p-toluenesulfonic acid was prepared according to the following reaction:

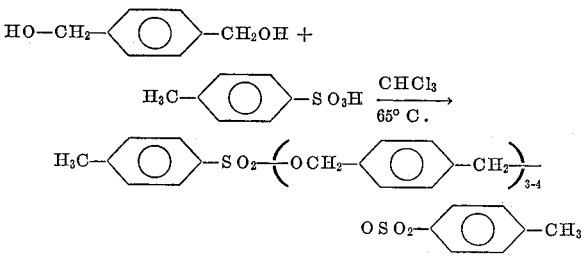

A copolymer of polyferrocenylene (10.0 grams, molecular weight 1470) was reacted at reflux temperature with 5.5 grams of the telomer in chloroform. Refluxing was carried out for 30 minutes. The reaction produced lacquer suitable for preparation of a laminate.

Example IX

A p-xylylene glycol-boron trifluoride telomer (55.9 grams of solution containing 4.14 grams of p-xylylene glycol and 0.24 gram of boron trifluoride etherate in 30 ml. of chloroform) was refluxed with polyferrocenylene (15.0 grams, molecular weight 2000) for two hours. The reaction produced a clear lacquer suitable for structural laminate or ablative composite preparations or for blending with particulate mineral fillers.

Example X

A mixture of polyferrocenylene (10.0 grams, molecular weight 1470) and p-xylylene glycol-boron trifluoride telomer (90.4 grams of solution containing 5.52 grams of p-xylylene glycol and 0.31 gram of boron trifluoride etherate) was heated at reflux for one hour to yield a clear solution.

The xylylene glycol telomer was prepared by heating at reflux a mixture of p-xylylene glycol (20 grams), boron trifluoride etherate (1 ml.), methylene chloride (26 ml.) and chlorobenzene (150 ml.) while removing water in an azeotropic trap. The clear, hot solution was concentrated in vacuum to a solid which was redissolved in chloroform (200 ml.), and 90.4 grams of this solution were used in the reaction.

Example XI

A solution of polyferrocenylene (10 grams, molecular weight 5300) in chloroform (50 ml.) was mixed with a chloroform solution of xylylene glycol telomer (21 grams). The latter was prepared from 2.6 grams of xylylene glycol, 0.13 ml. of boron trifluoride etherate, methylene chloride (3.3 ml.) and chlorobenzene (19 ml.) by heating the slurry at reflux for 45 minutes while removing water by azeotropic distillation, taking the solution to dryness, and redissolving the solids in chloroform (13 ml.). The mixture of polyferrocenylene and telomer solution was heated at reflux for one hour to provide 100 grams of lacquer.

The lacquers prepared in Examples VI through XI were used to coat reinforcing materials such as glass fabric, carbon cloth, quartz and asbestos. The coated materials were then subjected to temperatures of about 200° C. to about 300° C. and pressures of about 200 p.s.i. to about 4000 p.s.i. The application of heat and pressure resulted in the formation of excellent laminates.

The foregoing specific examples should not be construed as limiting the invention.

We claim:

1. The copolymers of the general structure:

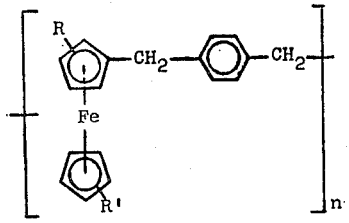

wherein R and R' are selected from the group consisting of H, $CH_3$, $C_2H_5$, $C_3H_7$, $C_4H_9$, $C_6H_5$, SH, Cl, Br and I and wherein $n$ is an integer of from 2 to 10.

2. The copolymer of the general structure:

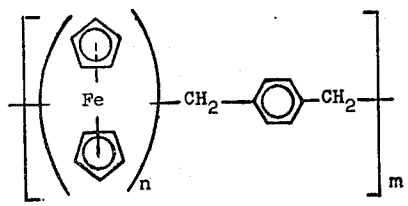

wherein $n$ is an integer of from 2 to 10 and wherein $m$ is an integer of from 2 to 20.

3. The method of preparing copolymers of the general structure:

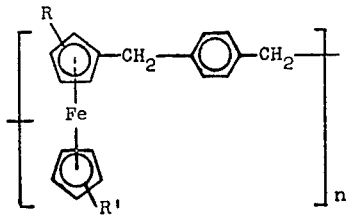

where R and R' are selected from the group consisting of H, $CH_3$, $C_2H_5$, $C_3H_7$, $C_4H_9$, $C_6H_5$, $C_6H_5CH_2$, $CH_3O$, $C_2H_5O$, SH, Cl, Br and I and wherein $n$ is an integer of from 2 to 10; said method comprising the steps of:

(A) forming a solution by dissolving a ferrocenyl compound of the structure

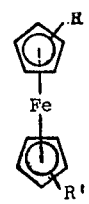

wherein R and R' are selected from the group above, p-xylylene glycol, and catalytic amounts of a suitable catalyst in a suitable solvent;

(B) refluxing said solution for a period of from about 2 hours to about 24 hours while removing water of condensation; and (C) concentrating said solution to dryness to recover the reaction product.

4. The method of preparing a lacquer containing copolymers of the general structure:

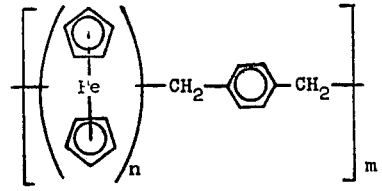

wherein $n$ is an integer of from 2 to 10 and $m$ is an integer of from 2 to 20; said method comprising the steps of:

(A) forming a solution by dissolving a polyferrocenylene of the structure

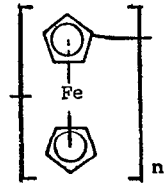

wherein $n$ is an integer of from 2 to 10, p-xylylene glycol, and catalytic amounts of a suitable catalyst in a suitable solvent; and (B) refluxing said solution while removing water of condensation for a period of about 30 minutes to about 24 hours to form said lacquer.

5. A method of preparing an impregnated article, said method comprising the steps of:

(A) forming a lacquer or varnish by dissolving a copolymer defined in claim 1 in a suitable lacquer or varnish type solvent;

(B) applying said lacquer or varnish to a suitable reinforcing material to form a coated reinforcing material; and
(C) subjecting said coated reinforcing material to heat and pressure to cure said copolymer and form an impregnated article.

6. A method of forming an impregnated article, said method comprising the steps of:
(A) forming a lacquer containing copolymers of the general structure:

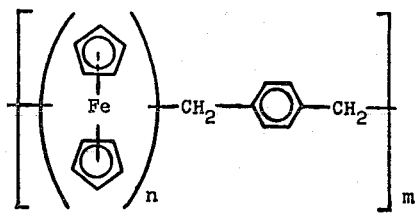

wherein $n$ is an integer of from 2 to 10 and wherein $m$ is an integer of from 2 to 20; said lacquer being formed by the method comprising the steps of:
(a) forming a solution by dissolving a polyferrocenylene of the structure:

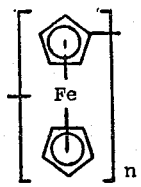

wherein $n$ is an integer of from 2 to 10, p-xylylene glycol, and catalytic amounts of a suitable catalyst in a suitable solvent; and
(b) refluxing said solution for a period of about 30 minutes to about 24 hours while removing water of condensation to form said lacquer;
(B) applying said lacquer as a coat to suitable reinforcing material to form a coated reinforcing material; and
(C) subjecting said coated reinforcing material to heat and pressure to effect a cure of said copolymers and form an impregnated article.

7. A method of preparing a filled resinous composition comprising the steps of:
(A) forming a lacquer by dissolving the copolymer defined by claim 2 in a solvent selected from the group consisting of methylene chloride, chloroform, trichloroethylene, carbon tetrachloride, and tetrachloroethane;
(B) blending said lacquer with a powdered filler selected from the group consisting of clay, silica, powdered thermoset phenolic resin, and titania;
(C) drying said lacquer; and
(D) subjecting said filled composition to heat and pressure to produce a cure.

8. An impregnated article which comprises a cured copolymer having repeating units of the formula:

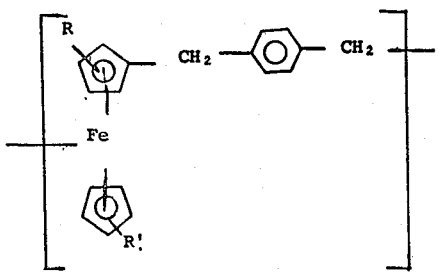

wherein R and R' are selected from the group consisting of H, $CH_3$, $C_2H_5$, $C_3H_7$, $C_4H_9$, $C_6H_5$, SH, Cl, Br, and I, and a reinforcing material impregnated with said cured copolymer, said reinforcing material being selected from the group consisting of glass fabric, carbon cloth, quartz, and asbestos.

9. An impregnated article which comprises a cured copolymer having repeating units of the formula:

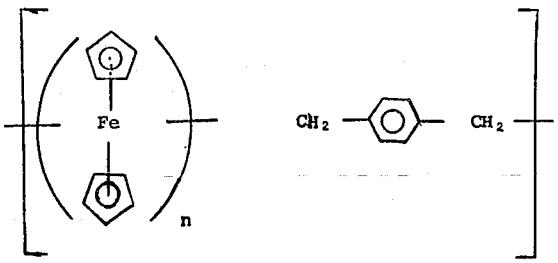

wherein $n$ is an integer of from 2 to 10, and a reinforcing material impregnated with said cured copolymer, said reinforcing material being selected from the group consisting of glass fabric, carbon cloth, quartz, and asbestos.

10. An impregnated article which comprises a cured copolymer having repeating units of the structure:

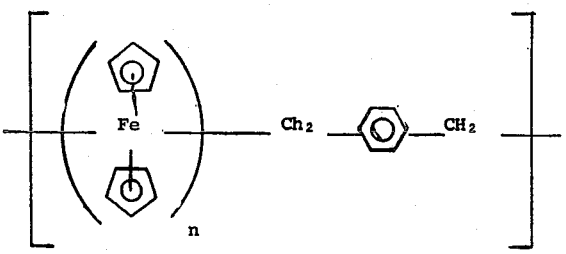

wherein $n$ is an integer of from 2 to 10, and a filler dispersed in said cured copolymer, said filler being selected from the group consisting of clay, silica, powdered thermoset phenolic resin, and titania.

11. A method of preparing a laminated article, said method comprising the steps of:
(A) forming a lacquer by dissolving a copolymer in a solvent therefor, said copolymer having a structure represented by a formula selected from the group consisting of:

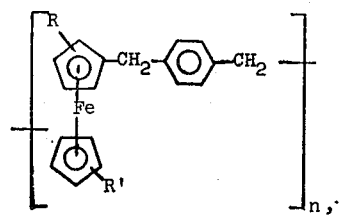

and

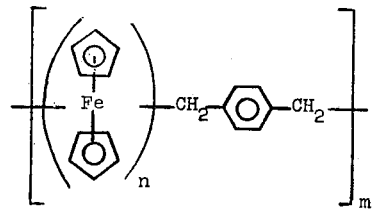

wherein R and R' are selected from the group consisting of H, $CH_3$, $C_2H_5$, $C_3H_7$, $C_4H_9$, $C_6H_5$, SH, Cl, Br, and I, and wherein $m$ is an integer having a value of from 2 to 20 and $n$ is an integer having a value of from 2 to 10;
(B) impregnating a reinforcing material with said lacquer;

(C) stacking a plurality of layers of said impregnated reinforcing material in a mold; and
(D) molding said layers at a temperature of from 150° to 250° C. under a pressure of from 200 p.s.i. to 4000 p.s.i.

12. A laminated article which consists essentially of a plurality of stacked and molded layers of impregnated reinforcing material, each of said layers of impregnated reinforcing material consisting essentially of said reinforcing material and a cured copolymeric material having repeating units selected from the group represented by the structural formulas:

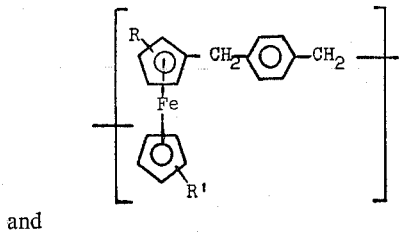

and

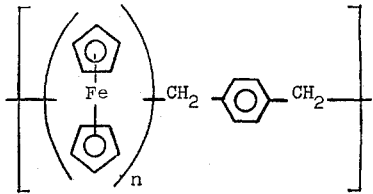

wherein R and R' are selected from the group consisting of H, $C_2H_5$, $C_3H_7$, $C_4H_9$, $C_6H_5$, SH, Cl, Br, and I and wherein $n$ is an integer having a value of from 2 to 10.

References Cited
UNITED STATES PATENTS

| | | | |
|---|---|---|---|
| 3,238,185 | 3/1966 | Neuse | 260—2MX |
| 3,341,495 | 9/1967 | Neuse | 260—80LX |
| 3,437,634 | 4/1969 | Neuse | 260—2MX |

MORRIS LIEBMAN, Primary Examiner

L. T. JACOBS, Assistant Examiner

U.S. Cl. X.R.

117—126; 260—37, 80

UNITED STATES PATENT OFFICE
CERTIFICATE OF CORRECTION

Patent No. 3,560,429          Dated 2 February 1971

Inventor(s) Norman Bilow and Harold Rosenberg

It is certified that error appears in the above-identified patent and that said Letters Patent are hereby corrected as shown below:

Column 1, line 6, that portion of the line reading "Secret of the Navy" should read "Secretary of the Air Force".

Signed and sealed this 25th day of May 1971.

(SEAL)
Attest:

EDWARD M. FLETCHER, JR.
Attesting Officer

WILLIAM E. SCHUYLER,
Commissioner of Patent